United States Patent
Thomas et al.

(10) Patent No.: US 8,841,596 B2
(45) Date of Patent: Sep. 23, 2014

(54) QUASI CONTINUOUS PHOTON DETECTION SYSTEM

(75) Inventors: Oliver Edward Thomas, Cambridge (GB); Andrew James Shields, Cambridge (GB); Zhiliang Yuan, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 12/906,624

(22) Filed: Oct. 18, 2010

(65) Prior Publication Data

US 2011/0108712 A1 May 12, 2011

(30) Foreign Application Priority Data

Nov. 9, 2009 (GB) .................................. 0919588.4

(51) Int. Cl.
*H01J 40/14* (2006.01)
*G01J 1/44* (2006.01)

(52) U.S. Cl.
CPC .......................................... *G01J 1/44* (2013.01)
USPC ........................................................ 250/214 R

(58) Field of Classification Search
USPC ........................................................ 250/214 R
See application file for complete search history.

(56) References Cited

U.S. PATENT DOCUMENTS

| | | | |
|---|---|---|---|
| 5,721,424 A * | 2/1998 | Price | 250/214 R |
| 6,218,657 B1 | 4/2001 | Bethune et al. | |
| 2010/0111305 A1 | 5/2010 | Yuan et al. | |
| 2012/0230702 A1 | 9/2012 | Yuan et al. | |

FOREIGN PATENT DOCUMENTS

| | | |
|---|---|---|
| EP | 1 993 146 A1 | 11/2008 |
| GB | 2 456 149 A | 7/2009 |
| GB | 2 457 238 A | 8/2009 |
| JP | 2011-508869 | 3/2011 |
| WO | WO 2005/029017 A1 | 3/2005 |
| WO | WO 2007/102430 | 9/2007 |
| WO | WO 2008/104799 A1 | 9/2008 |

OTHER PUBLICATIONS

Examination Report issued Jun. 17, 2010 in United Kingdom Application No. GB0919588.4.
Search Report issued Mar. 12, 2010 in United Kingdom Application No. GB0919588.4.
Hyo-Soon Kang, et al., "CMOS-compatible 60 GHz Harmonic Optoelectronic Mixer", International Microwave Symposium, 2007, pp. 233-236.
Zhi-Bin Sun, et al., "Single-Photon Detection at Telecom Wavelengths", Chinese Physics Letters, vol. 24, No. 2, 2007, pp. 574-576.
N. Namekata, et al., "800 MHz Single-photon detection at 1550-nm using an InGaAs/InP avalanche photodiode operated with a sine wave gating", Optics Express, vol. 14, No. 21, 2006, 7 pages.

(Continued)

*Primary Examiner* — Thanh Luu
(74) *Attorney, Agent, or Firm* — Oblon, Spivak, McClelland, Maier & Neustadt, L.L.P.

(57) ABSTRACT

A photon detection system comprising an avalanche photodiode and a voltage source for said avalanche photodiode, wherein said avalanche photodiode comprises Silicon or its heterostructures and wherein said voltage source is configured to bias said avalanche photodiode with a voltage component which is static with respect to time and a voltage component which varies with time.

12 Claims, 6 Drawing Sheets

(56) References Cited

OTHER PUBLICATIONS

Naoto Namekata, et al., "Differential phase shift quantum key distribution using single-photon detectors based on a sinusoidally gated InGaAs/InP avalanche photodiode", Applied Physics Letters, vol. 19, 2007, pp. 11112/1-11112/3.

International Search Report and Written Opinion issued Apr. 27, 2011, in PCT/GB2010/002049.

Akio Yoshizawa, et al., "A 1550 nm Single-Photon Detector Using a Thermoelectrically Cooled inGaAs Avalanche Photodiode", Japanese Journal Applied Physics, vol. 40, No. 1, XP-003017631, Jan. 1, 2001, pp. 200-201.

B. E. Kardynal, et al., "An avalanche-photodiode-based photon-number-resolving detector", Nature Photonics, Nature Publishing Group, vol. 2, XP008108358, Jul. 1, 2008, pp. 425-428.

Z. L. Yuan, et al., "High speed single photon detection in the near infrared", Applied Physics Letters, vol. 91, No. 4, XP-012100194, Jul. 27, 2007, pp. 041114-1 to 041114-3.

Xiuliang Chen, et al., "Photon-number resolving performance of the InGaAs/InP avalanche photodiode with short gates", Applied Physics Letters, vol. 95, No. 13, XP-012125831, 2009, pp. 131118-1 to 131118-3.

Examination Report under Section 18(3) issued Aug. 28, 2012 in Application No. GB0919588.4.

J. Blazej et al., "Avalanche dynamics in silicon avalanche single- and few-photon sensitive photodiode" IOP Publishing, Edison 16, Journal of Physics: Conference Series 193 (2009) 012041, pp. 1-3.

Office Action mailed Sep. 24, 2013 in Japanese Application No. 2012-537444 (w/English translation).

Office Action mailed Jun. 3, 2014 in Japanese Office Action 2012-537444 (w/English translation).

\* cited by examiner

QUASI CONTINUOUS PHOTON DETECTION SYSTEM

CROSS-REFERENCE TO RELATED APPLICATION(S)

This application is based upon and claims the benefit of priority from UK Patent Application No. 0919588.4 filed Nov. 9, 2009; the entire contents of which are incorporated herein by reference.

FIELD

Embodiments described herein generally relate to photon detectors and methods for detecting weak light signals.

BACKGROUND

There is a pressing need in a number of applications for optical light detectors which can register a response at the level of individual photons. Single photon detectors are threshold devices which detect the presence of 1 or more photons on the device, but cannot determine the number of photons. They are used for general low light level detection, as well as for various applications based around determining the arrival time of the photon at the detector.

The applications of single photon detectors include industrial inspection, environmental monitoring, testing of fibre optic cables and components, medical imaging, chemical analysis and scientific research. Many of these applications use the ability of a single photon detector to measure the arrival time of a single photon. In industrial inspection systems a bright laser pulse is directed at the object under inspection and the time for single photons from the pulse to be reflected are recorded. From the time of flight data it is possible to build a 3D image of the object. Similar techniques involving single photon detectors are used to determine the location of faults in optical fibres and components, and to measure particles in the atmosphere.

Single photon detection is also used in various forms of x-ray and radioisotrope imaging in medical imaging, as well as in laser optical imaging at infra-red wavelengths. Lifetime fluorescence measurements using single photon detection can be used in the diagnosis of some medical conditions. It is employed in analytical chemistry for determining the chemical recipe of a sample. Single photon detection is also used in scientific research in the field of particle physics, astrophysics and materials science.

Photon number resolving detectors, not only detect the presence of photons, but are able also to count the number of photons in an incident light pulse. Like single photon detectors they are able to determine the arrival time of the photons at the detector.

Photon number resolving detectors are required for low noise light detection based on photon counting. Here they have the advantage over single photon detectors that they can operate with higher light intensities.

The ability to resolve the number of photons in the incident pulse is also very important for many applications in quantum information technology. In a quantum relay, for example, it is necessary to distinguish between 0-, 1- and 2-photon detection events in each detector. A similar detector capability is needed for many of the gates used in linear optics quantum computing.

A photon number resolving detector which can operate at visible/near infra-red wavelengths (300-1100 nm) has applications for linear optics quantum computing, quantum relays and repeaters, quantum cryptography, photon number state generation and conditioning, and characterisation of photon emission statistics of light sources.

Currently Geiger Mode Silicon Avalanche Photodiodes (APDs) are used for low noise light detection at visible/near infra-red wavelengths (300-1100 nm).

BRIEF DESCRIPTION OF DRAWINGS

The present invention will now be described with reference to the following non-limiting embodiments in which.

DETAILED DESCRIPTION

Figure 1:
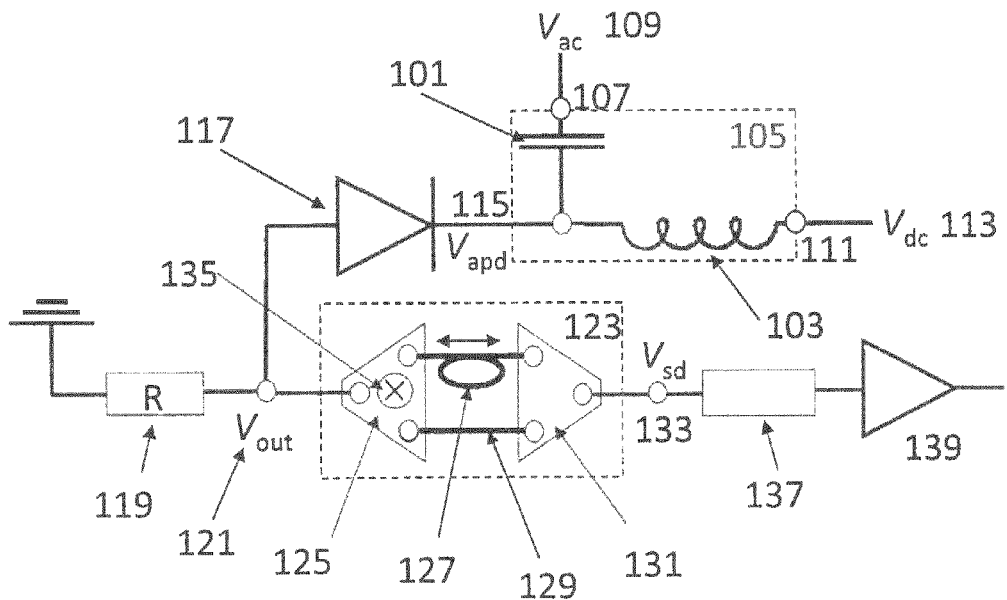
FIG. 1 is a schematic of a Silicon Self-Differencing Avalanche photodiode in accordance with an embodiment of the present invention.

According to an embodiment a photon detection system is provided comprising an avalanche photodiode and a voltage source for said avalanche photodiode, wherein said avalanche photodiode comprises Silicon or its heterostructures and wherein said voltage source is configured to bias said avalanche photodiode with a voltage component which is static with respect to time and a voltage component which varies with time.

In an embodiment, the photon absorbing layer within the APD has a bandgap larger than 1 eV. The APD may comprise Si or a Si heterostructure such as Si—Ge.

In a further embodiment the bias to the APD comprises a DC bias and an AC modulation bias which varies periodically in time.

The AC modulation period may be 100 ns or less and an amplitude of 1 Volt or more. The DC bias may be larger than the breakdown voltage of the APD.

As detectors in accordance with embodiments of the present invention can be used at high frequencies, they can achieve quasi-continuous operation. In quasi-continuous operation, there is no synchronization required between the source of photons and the detector. Quasi continuous operation is possible because for very high gating frequencies, the period at which the detector is incapable of detecting photons is not prohibitive to the overall detection efficiency.

To enhance quasi continuous operation, it is possible to vary the period of the gating signal to broaden the detection window. The period may be varied randomly or as noise. Thus, in an embodiment the period of the modulation varies as a function of time. In this situation, the time varying bias is quasi-periodic. For example, such a bias may vary the gating frequency by a small amount, for example less than 50 Hz.

In an embodiment, the APD bias voltage is above the APD breakdown voltage at its highest value and below the APD breakdown voltage at its lowest value during each period of modulating bias. This period may be referred to as the gating period or clocking period.

In an embodiment, the detector further comprises an output circuit configured to receive an output signal from said avalanche photodiode and process said output signal to remove a time varying component.

According to an embodiment a photon detection system is provided comprising an avalanche photodiode and an output circuit for said avalanche photodiode, wherein said avalanche photodiode comprises Silicon or its heterostructures and wherein said output circuit is configured to receive an output signal from said avalanche photodiode and process said output signal to remove a time varying component from said output signal.

In an embodiment, the output circuit compares the output voltage of the APD with than in a preceding period. In a further embodiment, the circuit combines the output voltage of the APD in the first and second half of the gating bias period.

In a further embodiment, a self differencing circuit is provided comprising a signal divider to split the signal into two parts, an electrical line to delay one of parts relative to the other and a signal differencer to output the difference between the two parts.

In one embodiment the delay is an integer number of gate periods.

In a yet further embodiment, a self differencing circuit is provided comprising a signal divider to split the signal into two parts, a phase shifter to shift the phase of one of the two parts by 180 degrees, or a signal inverter, and a signal combiner to output the sum of the two parts.

If a self differencing circuit is provided, it may further comprise a control unit configured to balance the strength of the two parts and/or vary the length of the delay.

An amplifier may be provided to amplify the output of the self-differencing circuit.

The output circuit may also comprise a filter to remove a periodic background or use 'lock-in' techniques to identify the avalanche signal.

As previously mentioned, the embodiments of present invention may be used for photon counting. Therefore, in a further embodiment an output circuit is provided to discriminate the output voltage between multiple predetermined levels. For example, such a circuit may be configured to measure the height of the avalanche peak, as the height of the peak is dependent on the number of photons detected. In a further example, the output circuit is provided with a discriminator, said discriminator being configured to set multiple discrimination levels, each discriminator level corresponding to a value of the output signal for 1, 2, 3, 4 photons etc.

In a further embodiment the photon detection system further comprises a cooler to lower the temperature of the avalanche photodiode.

In a further embodiment the photon detection system comprises beamsplitters to subdivide the incident pulse into several pulses which are detected using multiple avalanche photodiodes. In a further embodiment the detection system comprises an array of APD elements.

Light may be coupled to the avalanche photodiode through an optical fibre.

According to a further embodiment a method of detecting photons is provided, the method comprising:
 providing an avalanche photodiode comprising silicon or its heterostructures;
 applying a bias said avalanche photodiode with a voltage component which is static with respect to time and a voltage component which varies with time.

FIG. 1 depicts a photon detector in accordance with an embodiment of the present invention. The photon detector is a Silicon Avalanche Photodiode which is arranged in a configuration which allows self-differencing of the output signal. Self differencing will be described in more detail later in the description. The detector is referred to as a Silicon Self-Differencing Avalanche Photodiode (Si SD-APD).

APDs are well known in the art and the internal layer structure of the APD will not be described here.

Silicon based avalanche photodiode (APD) 117 is connected such that it is reverse biased. The bias voltage comprises both a DC component $V_{DC}$ 111 from DC bias source 113 and an AC component $V_{AC}$ 107 from AC bias source 109. The AC component.

The AC 107 and DC 111 components are combined using bias-tee 105. Bias tee 105 comprises, on a first arm of the tee, a capacitor 101 connected to the AC source 109 and, on the second arm of the tee, an inductor 103 connected to the DC source 113.

The output of the APD 117 is divided between a resistor 119 (which leads to ground) and self differencing circuit 123.

When a photon is incident on APD 117, an avalanche photocurrent is induced by an avalanche arising from photon detection which leads to a voltage across a series resistor 119, which corresponds to the output voltage, $V_{out}$ 121.

To isolate the periodic capacitive response of the APD 117 to a gating modulation, which masks small avalanches resulting from high-speed operation, a self-differencing circuit is used 123, comprising a signal divider 125, two electrical lines 127 and 129 and a signal differencer 131.

The Si-APD output voltage, $V_{out}$, 121 is input into signal divider 125, which divides the signal into two close to equal components. A potentiometer 135 is used to balance the dividing ratio and further equate the two components. Since one of the electrical lines 127 is longer than the other 129, one of these components is delayed.

The delay is chosen to be an integer number of gating periods T supplied by the AC voltage source 111, and the delay line 127 is chosen to be adjustable in order to tune the delay independently of T.

When these two signals are input into the signal differencer 131, they are subtracted one from the other and the strong periodic capacitive background is largely cancelled in the self-differencer output voltage, $V_{sd}$, 133. It is common to use a 780 MHz low-pass filter 137 and amplifier 139 to further improve the retardation of the capacitive background.

This allows small avalanches to be revealed in the self-differencer output, $V_{sd}$, 133. The amplitude of these small avalanches is dependent upon the incident photon number.

As an alternative to the set-up in FIG. 1, the electrical delay between the electrical lines 127 and 129 may be chosen to be an odd integer number of half the gating period T.

In this case the signal differencer 131 is replaced by a signal combiner, which adds the two signals. This also has the effect of cancelling the capacitive response of the APD 117 leaving only the weak photon induced avalanche.

The APD 117 comprises Silicon and may be of the deep junction or shallow junction variety. It may also be a Silicon-Germanium heterostructure. In one embodiment photon absorption takes place within the APD in a layer with an energy bandgap larger than 1 eV. Preferably the APD has a diameter of its active area of 10 to 200 microns. Preferably it has a junction capacitance less than 10 pF.

The photon detector in accordance with embodiments of the present invention allows low noise light detection at visible/near infra-red wavelengths (300-1100 nm).

In detectors in accordance with embodiment of the present invention, the APD is operated in a mode which is different to Geiger mode, where a time varying bias as well as a steady state bias is applied. This introduces periodic or quasi-periodic artefacts into the output signal which in normal operation would swamp the desired signal due to photon-induced avalanches. This would usually prevent the detection of the desired photon-induced signal. As a consequence it has previously been regarded as undesirable. In detectors in accordance with embodiments of the present invention the artefacts which arise from the operation of the device are removed from the output signal. For example, by comparing or combining the output signal from different periods or by removal of the time varying signals by filtering, or "lock-in" style techniques.

In detectors in accordance with embodiments of the present invention, noise is limited only by shot noise (quantum noise) due to statistical fluctuations in the number of photons in the signal. All other noise sources, such as amplifier noise, are eliminated.

Detectors in accordance with embodiments of the present invention offer other considerable advantages over other detectors which provide low noise light detection at visible/near infra-red wavelengths such as photomultiplier tubes, Si photodiodes, Si APDs and Geiger mode Si APDs. For example, it provides higher photon detection efficiency, lower dark count noise rate, lower afterpulse rate; lower timing jitter; the ability to synchronize to external clock; a relatively high dynamic range (i.e. can detect stronger light intensities than Geiger Mode Si APD); operation at room temperature or under thermoelectric cooling (ie does not need cryogens), and uses standard fabrication technology so is relatively cheap.

Further, detectors in accordance with embodiments of the present invention allow the number of photons in an incident pulse to be determined and provides considerable advantages over current photon number resolution detectors such as: high photon detection efficiency; low dark count noise rate; low afterpulse rate; low timing jitter; synchronized to external clock; high dynamic range; operates at room temperature or under thermoelectric cooling (ie does not need cryogens); and uses standard fabrication technology so is relatively cheap.

In a Geiger Mode Si APD a continuous dc voltage from a dc voltage source is provided to bias the APD above its breakdown voltage. Absorption of an incident photon creates an electron hole pair which can stimulate an avalanche of charge carriers through the device. The avalanche can be detected as a current pulse from the device. The avalanche pulse is typically sufficiently large that it saturates the device. Thus there is no discernable difference in the signal generated by absorption of 1, 2, 3 or more photons.

In contrast in detectors in accordance with embodiments of the present invention both a static voltage source and a time varying voltage source are used to provide an alternating bias that periodically biases the APD above and below its breakdown voltage.

In an embodiment (Silicon Self-Differencing Avalanche Photodiode (Si SD-APD)), a self-differencing circuit is used which compares the APD output voltage with that delayed by an integer number of gating bias periods. The result is that much weaker avalanches can be detected with the Si SD-APD, which do not saturate the device, and so the signal generated depends upon the number of absorbed photons. Such a circuit is described in WO2008/104799.

Devices in accordance with uses a Silicon based system with a Silicon APD or an APD comprising a Silicon heterostructure.

Using a Si APD in the above arrangement provides significant advantages over using an InGaAs based APD in a self-differencing arrangement. The Si APD has a much higher detection efficiency. A single photon detection efficiency up to 80% has been measured and higher values are possible using APDs with higher quantum efficiency. A high detection efficiency is important for single shot photon number detection, i.e. determining the number of photons in each individual pulse. This is desirable for many quantum information applications such as linear optics quantum computing or in a quantum relay or repeater.

Figure 2:
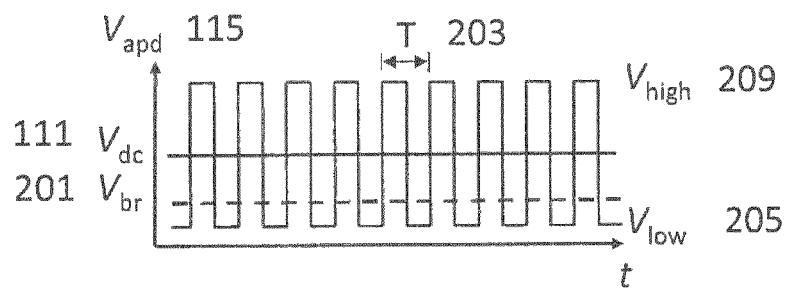
FIG. 2 is a plot of the APD bias voltage used to bias a photodiode in accordance with an embodiment of the present invention.

FIG. 2 shows the particular bias conditions required to obtain high single photon detection efficiency and photon number resolution from the Silicon Self-Differencing Avalanche Photodiode.

The APD has a reverse breakdown voltage $V_{br}$ 201 above which a macroscopic avalanche gain of photoexcited carriers can occur.

The APD bias voltage $V_{apd}$ 115, comprises a DC voltage $V_{dc}$ 111 superimposed on a AC voltage with peak-to-peak amplitude $V_{ac}$ 107 and a period T 203. The period of the AC bias is sometimes referred to as the gating period or the clock period and is the inverse of the gating frequency or clock frequency.

The gating period or clock period may be synchronised with that of a photon source. In one embodiment the gating frequency of the detector is varied by a small amount e.g. 50 kHz, which is used to essentially broaden the time window over which the detector is capable of detecting photons.

This results in the APD bias voltage 115, lying above the breakdown voltage 201 at its highest values $V_{high}$ 209 and below the breakdown voltage 201 at its lowest values $V_{low}$ 205. $V_{dc}$ can also be set below the breakdown voltage.

It has been found experimentally that it is preferable if the DC bias, $V_{dc}$, 111 is larger in magnitude than the reverse breakdown voltage, $V_{br}$ 201.

The Si SD-APD may be operated with an AC gating period of 1 ns, corresponding to a gating frequency of 1 GHz.

Depending on the operation temperature and the actual device structures, the breakdown voltage for APDs can vary from 20 to 300 V. (Note this is written as a positive number, although it is actually a reverse bias applied to the p-n junction of the APD).

The Si-APD may be operated with a DC bias $V_{dc}$ of 48.5 Volts and an AC voltage peak to peak amplitude of $V_{ac}$=12.0 V.

Figure 3:
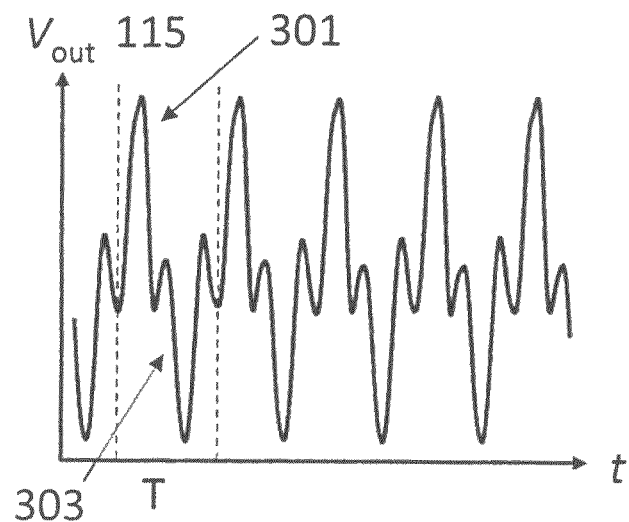
FIG. 3 is a plot of the output signal $V_{out}$ from a the device of FIG. 1, biased using the scheme of FIG. 2.

FIG. 3 shows the measured electrical response of a Silicon APD, $V_{out}$, 121 to the circuit and bias conditions $V_{apd}$ 115 described above.

The strong oscillatory signal observed in $V_{out}$ 121 is due to the capacitive response of the APD 117 to the applied AC voltage Vac 107.

These strong oscillations conceal any contribution to the signal from avalanches stimulated by photons absorbed in the APD 117.

A positive peak 301 is due to the charging of the Si-APD capacitance when reacting to the leading edge of the AC bias 107, followed by a negative peak 303 corresponding to the capacitive discharging arising from the falling edge of the AC bias 107.

Clearly these very strong oscillations due to the capacitive response of the APD, mean that it is usually not desirable to operate Si-APDs in gated Geiger Mode for single photon detection.

Figure 4:
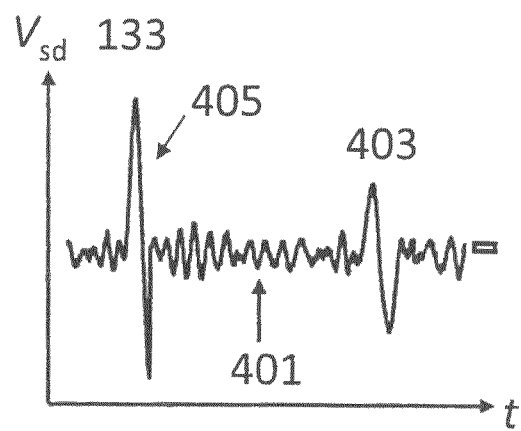
FIG. 4 is a plot of the output of the device of FIG. 1 captured on an oscilloscope.

FIG. 4 shows the measured self-differencer output, $V_{sd}$, 133 for one photon 403, two photons 405 and no detected photons 401, sampled using a fast digital oscilloscope.

Note that the 0-photon signal 401 has finite amplitude due to the imperfect cancellation of the self-differencing circuit.

The 2-photon peak 405 has approximately double the amplitude of the 1-photon peak 403, indicating that there is approximately linear dependence of the output voltage, $V_{sd}$, 133 on the detected photon number.

This proves that the detector works as a photon number resolving detector. Further, a circuit may be provided which allows the number of photons detected in a single period to be calculated.

Figure 5:
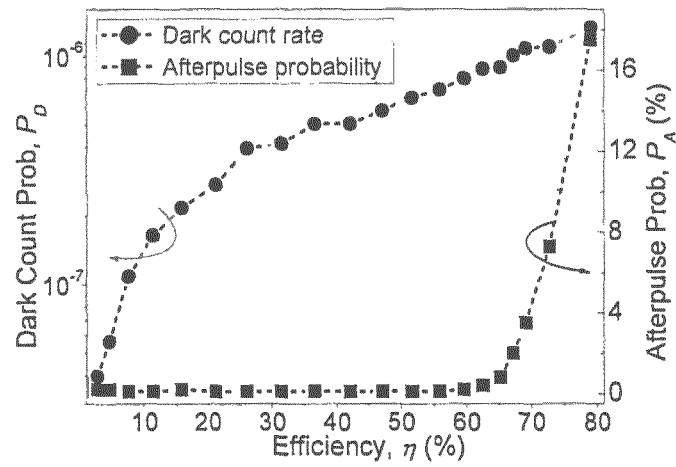
FIG. 5 is a plot of the dark count probability, $P_D$, (circles) and the afterpulse probability, $P_A$ (squares) as a function of the single photon detection efficiency of the device of FIG. 1.

FIG. 5 presents a plot showing the Si-APD single photon detection performance. The dark count probability, $P_D$ (circles), and afterpulse probability, $P_A$ (squares), were measured as a function of the applied DC bias, $V_{dc}$, and are shown in terms of the photon detection efficiency, q.

The afterpulse probability is negligible for q<60%, above which it begins to rise increasingly sharply and a critical point occurs around n=73% for which $P_A$=7.5%.

The value of $P_D$ for this detection efficiency is $10^{-6}$ (measured per AC bias gate), corresponding to a dark count rate around 1 kHz at T=−35° C.

Figure 6:
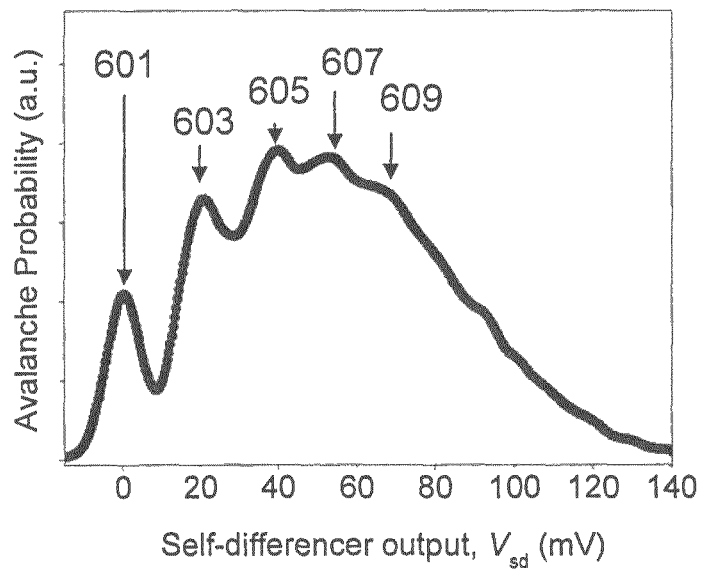
FIG. 6 is a plot of the probability distribution reflecting the statistics of the avalanche peak height of the output, $V_{sd}$, for a fixed average photon flux for the device of FIG. 1.

FIG. 6 shows the avalanche statistics, arising from the avalanche probability plotted as a function of the self-differencer output, $V_{sd}$.

The probability distribution is obtained from around 6 million samples, and accumulated in real-time using a fast digital oscilloscope.

Peak 601 at 0 mV corresponds to the O-photon contribution from gates in which no photon was detected.

The width of this feature (~15 mV) is attributed to a residual component of the capacitive response of the diode, due to the imperfect cancellation of the self-differencer circuit.

The feature around 26.1 mV, peak 603, is due to avalanches arising from the absorption of one photon and peaks 605, 607 and 609 at 45.7 mV, 66.0 mV and 84.0 mV respectively correspond to the detection of two, three and four photons.

The periodic spacing of these features is evidence that the dependence of the unsaturated self-differencer output of Si-APDs on the incident photon number is approximately linear.

The detector may comprise a circuit which is configured to measure the output signal against discrimination levels. Said discrimination levels being set to distinguish between the number of photons received.

Figure 7:
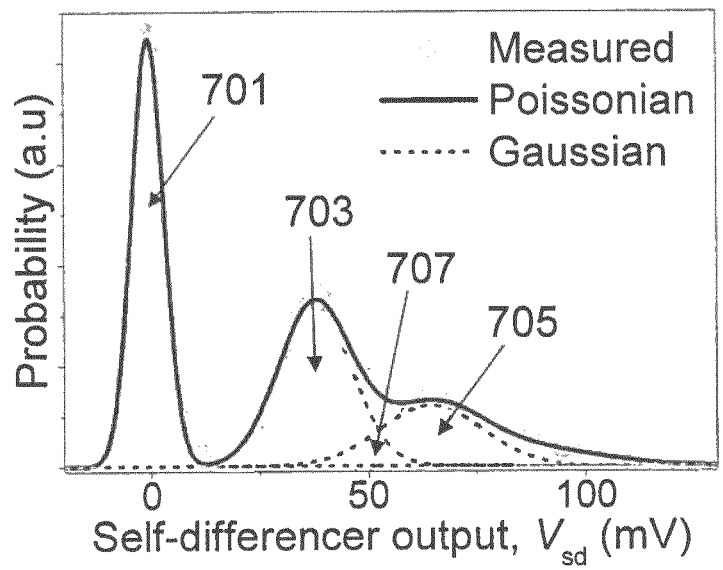
FIG. 7 is a plot of the measured avalanche probability distribution (circles) with a fit (black solid line) corresponding to the Poissonian distribution of an attenuated laser source for the same photon flux.

FIG. 7 shows a measured avalanche probability distribution (circles) for which the 1- and 2-photons peaks, 703 and 705, are almost entirely separated from the O-photon peak 701.

This is achieved by tuning the arrival time of the photon with respect to the Si-APD gate, and the biases $V_{dc}$ and $V_{ac}$. The black solid curve corresponds to the Poissonian statistics of the attenuated laser source and is obtained by fitting Gaussians to model the 0-, 1- and 2-photon contributions (dashed lines).

The widths of these Gaussian fits are scaled according to the statistical broadening $\sqrt{N}$, where N is the incident photon number. The photon number resolution is quantified in terms of the numerical overlap between the adjacent Gaussian curves 707, and corresponds to the error in determining the incident photon number from the avalanche voltage, $V_{sd}$.

Figure 8:
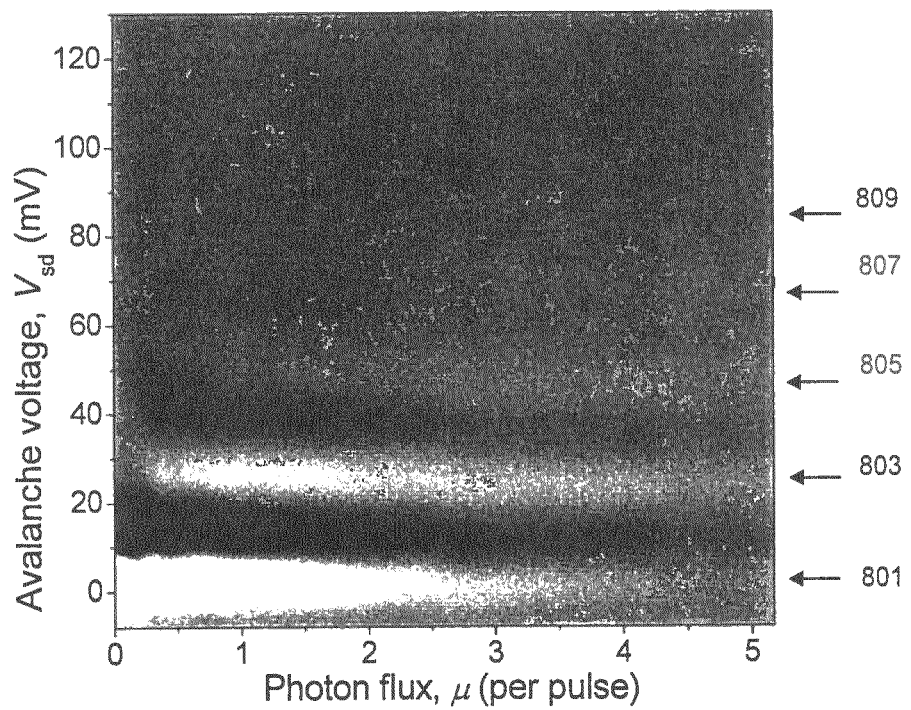
FIG. 8 is a grey scale plot of the derivative of the avalanche probability distribution, $\delta(\text{Probability})/\delta V_{sd}$, coming out of the page, as a function of the photon flux, p, and the self-differencer output, $V_{sd}$ for the device of FIG. 1

FIG. 8 confirms the dependence of the output from a self-differencing Si-APD photon number detector on the incident photon flux, p.

Here, the derivative of the avalanche probability, $\delta(\text{Probability})/\delta V_{sd}$, is plotted coming out of the page as a function of the photon flux, p, and the self-differencer output, $V_{sd}$.

White corresponds to high intensity and black corresponds to low intensity. The mean voltage position of the O-photon peak 801 is fixed whilst the mean positions of the 1-, 2-, 3- and 4-photon peaks (803, 805, 807 and 809 respectively) shift to slightly lower voltage with increasing photon flux due to sample heating caused by the increased photocurrent.

The relative intensities of the peaks vary in accordance with the Poissonian statistics of the source.

Figure 9:
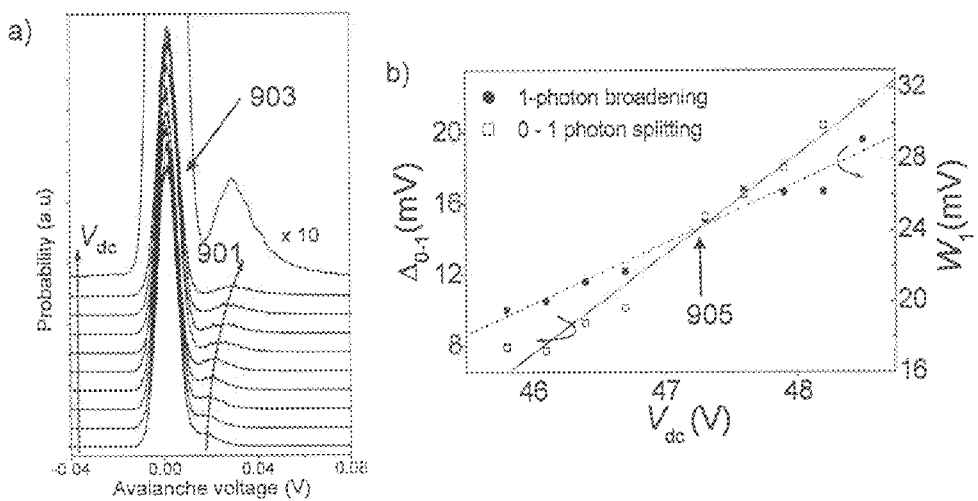
FIG. 9a) is a plot of the single photon avalanche probability distribution of the device of FIG. 1 as a function of the applied DC bias, $V_{dc}$ and FIG. 9b) shows plots of the measured 1-photon peak width, $W_1$, and the 0-1-photon peak separation, as a function of the applied DC bias, $V_{dc}$ for the device of FIG. 1.

FIG. 9a shows the dependence of the single photon avalanche probability distribution on the applied DC bias, $V_{dc}$. The curved arrow, corresponding to the centre of the 1-photon peak, serves as a guide to the eye. The top curve corresponds to a factor-10 magnification of the highest voltage curve.

As $V_{dc}$ is increased, so to do the width of the 1-photon peak 901, $W_1$, and the separation of this feature from the O-photon peak 903, $\Delta_{0-1}$.

These parameters were obtained from fits using Gaussians obeying Poissonian statistics and are plotted as a function of $V_{dc}$ in FIG. 9b, which reveals a linear dependence of each.

The rate of change of $\Delta_{0-1}$ (squares) is greater than that of $W_1$ (circles) and there is an intersection point corresponding to a critical voltage, $V_c$ 905.

Above this point, the separation of the peaks increases more than the statistical broadening of the peaks, corresponding to an increase in the photon number resolution. It is noted that the maximum DC voltage that can be applied is limited by the maximum obtainable AC modulation, which is used to quench the avalanche current.

Figure 10:
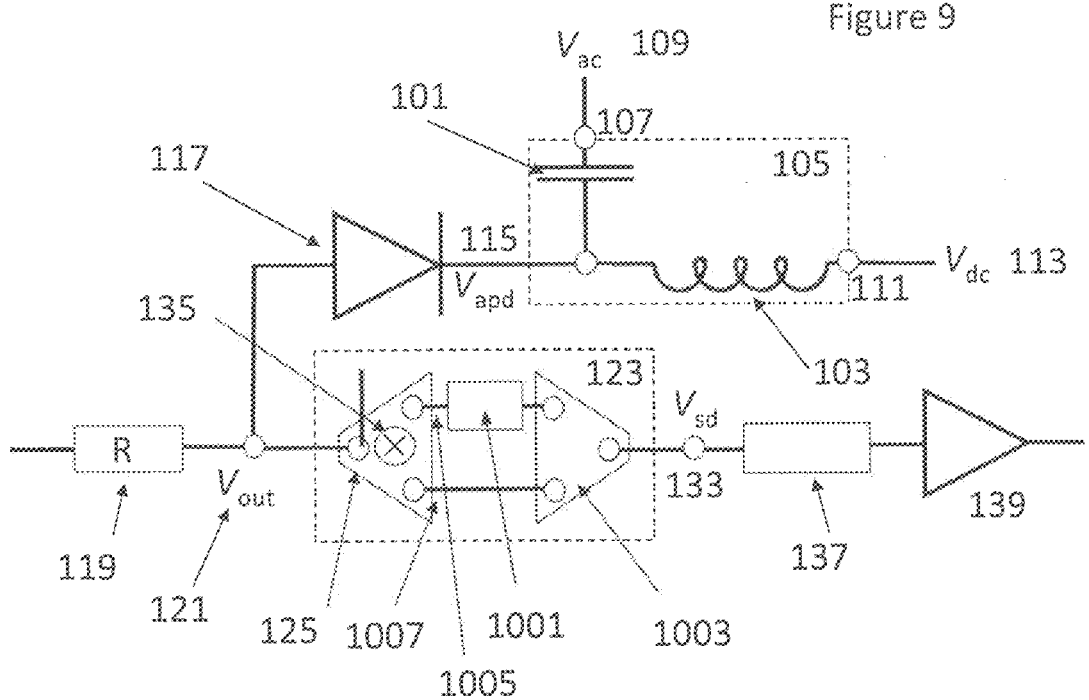
FIG. 10 is a schematic of a photon detector in accordance with a further embodiment of the present invention.

FIG. 10 shows a variant of the Silicon Self-Differencing Avalanche Photodiode (Si SD-APD).

Here the electrical lines 127 and 129 of FIG. 1 are replaced with a phase shifter 1001, so as to create a phase shift of 180 degrees in one (1005) of the two outputs (1005, 1007) of the power splitter 125. The 180° phase shifter act as a signal inverter.

The signal differencer 131 of FIG. 1 is replaced with a signal combiner 1003, whose function is to add the two signals.

Since they have a relative phase shift of 180° this has the effect of cancelling the capacitive response of the APD.

This allows the detection of weak avalanches in a similar fashion to that described in the preceding description.

Figure 11:
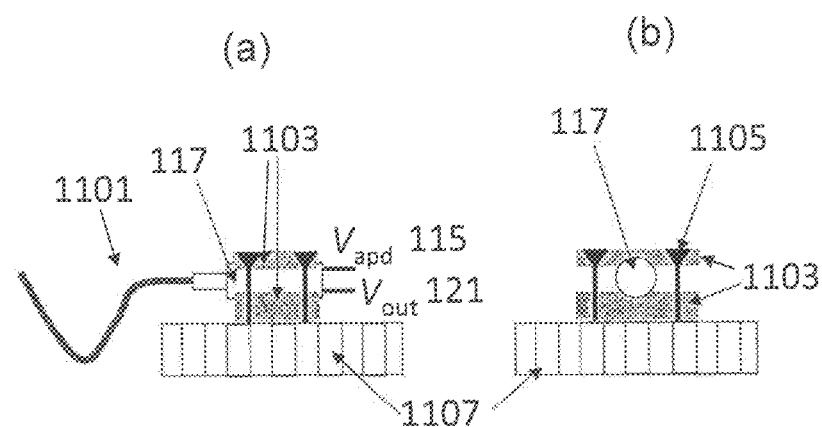
FIG. 11a is a schematic of a photon detector in accordance with an embodiment of the present invention in which the detector is mounted on a thermo-electric cooler viewed from a side and FIG. 11b is a schematic of the same photon detector of FIG. 11a viewed from the front.

FIGS. 11a and b show a side view and a front view (the front being the side where a fibre is coupled to said detector)

respectively of a Silicon Self-Differencing Avalanche Photodiode 117 mounted on a thermo-electric cooler 1107.

Thermal contact is provided to the case of the packaged device 117 through a copper heat-sink 1103 and conductive screws 1105. A temperature of T=−35° C. is commonly used.

Optical access to the sample is provided by an optical fibre pigtail 1101. Electrical access to the Si-APD, $V_{apd}$ 115 and $V_{out}$ 121 is provided by metallic pins.

Figure 12:
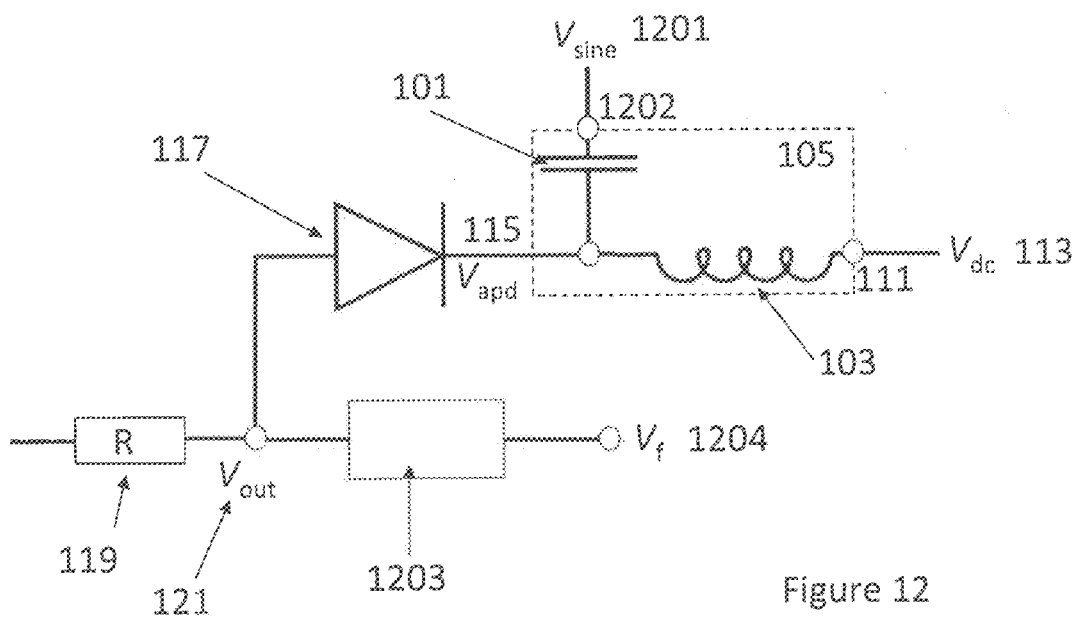
FIG. 12 is a schematic of detector in accordance with a further embodiment of the present invention using sine-wave gating modulation.

FIG. 12 depicts an alternative embodiment of a gated Geiger Mode Silicon Avalanche Photodiode.

Here the AC voltage source 109 outputting $V_{ac}$ 107, is replaced by a sine-wave signal generator 1201, operating at frequency f. The sine wave modulation voltage, $V_{sine}$ 1202, is combined with the fixed DC voltage, $V_{dc}$ 111, as before to form the APD bias voltage $V_{apd}$ 117.

The self-differencing-circuit 123 is replaced by a band rejection filter 1203, with a stop-band corresponding to the sine-wave frequency, f, which retards the periodic capacitive response of the APD in the filtered voltage output $V_f$ 1204.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A photon detection system comprising:
    an avalanche photodiode and a voltage source for said avalanche photodiode, wherein said avalanche photodiode comprises silicon or its heterostructures and wherein said voltage source is configured to bias said avalanche photodiode with a voltage component which is static with respect to time and a voltage component which varies with time such that an alternating bias is provided that in successive periods biases the avalanche photodiode above and below its breakdown voltage, wherein the voltage component which is static with respect to time is a DC bias and the alternating bias is an AC modulation bias which varies periodically in time and the AC modulation has a period less than 100 ns, the DC bias being larger than the breakdown voltage of the avalanche photodiode, the AC bias resulting in the avalanche photodiode being biased above its breakdown voltage at the highest values of the bias applied to the avalanche photodiode and below the breakdown voltage at the lowest values of the bias applied to the avalanche photodiode,
    the system further comprising,
    an output circuit configured to receive an output signal from said avalanche photodiode and process said output signal to remove a time varying component from said output signal, the output circuit comprising,
    a signal divider to split the output signal into two parts,
    an electrical line to delay one of the two parts relative to the other so as to produce a delayed part and a non-delayed part, and
    a signal differencer to output the difference between the delayed part and the non-delayed part, such that a time varying component of the output signal which appears in each period is removed from the output signal; and
    a circuit configured to discriminate an output signal from said avalanche photodiode, with the time varying component removed by the output circuit, between multiple predetermined levels to determine the number of photons absorbed by the avalanche photodiode.

2. A photon detection system according to claim 1, where the voltage component which varies with respect to time has an amplitude larger than 1 Volt.

3. A photon detection system according to claim 1, where the DC bias has a value larger than the breakdown voltage of the avalanche photodiode.

4. A photon detection system according to claim 1, wherein said output circuit is configured to combine the output voltage of the avalanche photodiode in the first and second half of the period of the alternating bias.

5. A photon detection system according to claim 1, where the delay is an integer number of gate periods.

6. A photon detection system according to claim 1, further comprising a controller to balance the strength of the two parts.

7. A photon detection system according to claim 1, further comprising a controller figured to vary the length of the delay.

8. A photon detection system according to claim 1, where the output circuit comprises a phase shifter to shift the phase of one of the two parts by 180 degrees, or a signal inverter, and a signal combiner to output the sum of the two parts.

9. A photon detection system according to claim 1, where the period of the modulation varies as a function of time.

10. A photon detection system according to claim 1, which further comprises a cooler to lower the temperature of the avalanche photodiode.

11. A photon detection system according to claim 1, which further comprises multiple avalanche photodiodes elements.

12. A method of detecting photons, the method comprising:
    providing an avalanche photodiode comprising silicon or its heterostructures; and
    applying a bias to said avalanche photodiode with a voltage component which is static with respect to time and a voltage component which varies with time, such that an alternating bias is provided that in successive periods biases the avalanche photodiode above and below its breakdown voltage, wherein the voltage component which is static with respect to time is a DC bias and the alternating bias is an AC modulation bias which varies periodically in time and the AC modulation has a period less than 100 ns, the DC bias being larger than the breakdown voltage of the avalanche photodiode, the AC bias resulting in the avalanche photodiode being biased above its breakdown voltage at the highest values of the bias applied to the avalanche photodiode and below the breakdown voltage at the lowest values of the bias applied to the avalanche photodiode, the avalanche photodiode producing an output signal,
    processing said output signal from said avalanche photodiode to remove a time varying component from said output signal, including
    splitting the output signal into two parts, delaying one of parts relative to the other to produce a delayed part and a non-delayed part, and outputting a difference between the delayed part and the not-delayed part, such that a time varying component of the output signal which appears in each period is removed from the output signal; and
    discriminating the output signal, with the time varying component removed, between multiple predetermined levels to determine the number of photons absorbed by the avalanche photodiode.

* * * * *